United States Patent
Danielsen et al.

(10) Patent No.: US 11,686,293 B2
(45) Date of Patent: Jun. 27, 2023

(54) DEVICES AND METHODS FOR MITIGATING VIBRATIONS IN WIND TURBINES

(71) Applicant: General Electric Renovables Espana, S.L., Barcelona (ES)

(72) Inventors: Darren John Danielsen, Greenville, SC (US); Marc Canal Vila, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/959,463

(22) Filed: Oct. 4, 2022

(65) Prior Publication Data
US 2023/0104837 A1 Apr. 6, 2023

(30) Foreign Application Priority Data
Oct. 4, 2021 (EP) ...................... 21382892

(51) Int. Cl.
*F03D 80/50* (2016.01)
*F03D 1/06* (2006.01)

(52) U.S. Cl.
CPC ........... *F03D 80/50* (2016.05); *F03D 1/0675* (2013.01); *F05D 2260/96* (2013.01)

(58) Field of Classification Search
CPC ........ F03D 1/0675; F03D 13/10; F03D 80/50; F05D 2260/96
See application file for complete search history.

(56) References Cited

U.S. PATENT DOCUMENTS 8,851,211 B2 * 10/2014 Schlee ................... F03D 80/50
280/412
9,316,202 B2 4/2016 Bech
(Continued)

FOREIGN PATENT DOCUMENTS

| CA | 3092485 A1 | 3/2021 |
| DK | 179394 B1 | 5/2018 |

(Continued)

OTHER PUBLICATIONS

European Search Report Corresponding to EP21382892 dated Mar. 16, 2022.
(Continued)

*Primary Examiner* — Justin D Seabe
*Assistant Examiner* — Sang K Kim
(74) *Attorney, Agent, or Firm* — Dority & Manning, P.A.

(57) ABSTRACT

The present disclosure relates to devices (300) for wind turbine blades (22) and methods (400) for reducing vibrations in wind turbines (10). More particularly, the present disclosure relates to devices (300) for mitigating vortex induced vibrations and stall induced vibrations, wind turbine blades (22) comprising such devices (300), and methods (400) for reducing wind turbine vibrations when the wind turbine (10) is parked, especially during wind turbine installation and/or maintenance. A device (300) is configured to be arranged around a wind turbine blade (22) and comprises three or more air flow modifying elements (305) comprising a concave outer surface (323) configured to face away from a wind turbine blade (22). The device further comprises a supporting structure (310) configured to support the plurality of air flow modifying elements (305). An angular distance (307) between adjacent air flow modifying elements (305) in cross-section is substantially constant.

20 Claims, 9 Drawing Sheets

(56) References Cited

U.S. PATENT DOCUMENTS

| | | | |
|---|---|---|---|
| 10,288,039 B2 | 5/2019 | Chen et al. | |
| 10,337,540 B2 | 7/2019 | Wardropper et al. | |
| 10,352,062 B2 * | 7/2019 | Fletcher | F03D 80/50 |
| 10,487,806 B2 * | 11/2019 | Huot | E04G 3/243 |
| 10,634,123 B2 * | 4/2020 | Georgeson | G01C 9/06 |
| 2012/0301293 A1 | 11/2012 | Bech | |
| 2015/0219070 A1 | 8/2015 | Gil Molla | |
| 2017/0002797 A1 | 1/2017 | Chen et al. | |
| 2017/0370386 A1 | 12/2017 | Wardropper et al. | |
| 2018/0171975 A1 | 6/2018 | Rohm | |
| 2020/0116128 A1 | 4/2020 | Pedersen et al. | |
| 2021/0079896 A1 * | 3/2021 | Herrig | F03D 3/04 |
| 2022/0325537 A1 * | 10/2022 | Junker | E04G 3/30 |

FOREIGN PATENT DOCUMENTS

| | | |
|---|---|---|
| EP | 2565440 A2 | 3/2013 |
| EP | 3112667 A1 | 1/2017 |
| EP | 3795824 A1 | 3/2021 |
| GB | 2475865 A | 6/2011 |
| WO | WO2011067304 | 6/2011 |
| WO | WO2016107624 A1 | 7/2016 |
| WO | WO2019015731 A1 | 1/2019 |

OTHER PUBLICATIONS

Lee, Airfoil Vortex Induced Vibration Suppression Devices, Thesis B.S. Naval Architecture and Marine Engineering, Massachusetts Institute of Technology Department of Mechanical Engineering, May 2007, 84 Pages. https://dspace.mit.edu/handle/1721.1/39874.

* cited by examiner

DEVICES AND METHODS FOR MITIGATING VIBRATIONS IN WIND TURBINES

The present disclosure relates to devices for wind turbine blades and methods for reducing vibrations in wind turbines. More particularly, the present disclosure relates to devices for mitigating vortex induced vibrations and stall induced vibrations, wind turbine blades comprising such devices, and methods for reducing wind turbine vibrations when the wind turbine is parked, especially during wind turbine installation and/or maintenance.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

There is a trend to make wind turbine blades increasingly longer to capture more wind and convert the energy of the wind into electricity. This makes blades more flexible and more prone to vibrations of the blades. Wind turbine blades vibrating excessively may get damaged. Vibrations of the rotor blades may also result in the whole wind turbine structure oscillating e.g. fore-aft oscillations, or sideways oscillations. Vibrations in the wind turbine blade may also damage other components of the wind turbine due to excessive stress.

When the wind turbine is in operation (i.e. producing energy and connected to an electrical grid), a wind turbine controller may operate auxiliary drive systems such as a pitch system or a yaw system to reduce or change loads on the blades. This way, vibrations of the blades may be counteracted. However, the problem of vibrations can be serious as well in circumstances when the wind turbine is parked and disconnected from the grid.

When a wind turbine is parked, the wind may blow against the wind turbine from unusual directions, i.e. different from when in normal operation. The airflow around the wind turbine may cause the wind turbine to vibrate. Vibrations may stress and even damage one or more wind turbine components, which may compromise the performance of the wind turbine, increase the need of repairs and reduce the lifespan of the wind turbine. As an orientation of a wind turbine blade cannot be adapted to the direction of the incoming wind, e.g. through yawing and/or pitching as opposed to when the wind turbine is operating, the effects of vibrations may be greater or different when the wind turbine is parked than when the wind turbine is operating normally and producing energy.

In particular, this may apply when the wind turbine is being installed or commissioned. For example, it may happen that an incomplete rotor is installed (e.g. a rotor having a single blade or two blades out of the total of three blades). The remaining blades may not be installed until a few days or a week later. In the meantime, the partially installed (or "incomplete") rotor may be in standstill. The rotor may or may not be locked, and the wind turbine can be exposed to varying wind conditions. This may likewise apply if the wind turbine is stopped during several hours, days or weeks, e.g. for maintenance reasons. A wind turbine blade can start to vibrate in any of these conditions depending particularly on the direction of the wind.

SUMMARY

In an aspect of the present disclosure, a device for mitigating vibrations of a parked wind turbine is provided. The device is configured to be arranged around a wind turbine blade. The vibration mitigating device has a length along a longitudinal direction and a cross-section substantially perpendicular to the longitudinal direction. The cross-section includes a radial direction and a tangential direction. The device comprises three or more air flow modifying elements comprising a concave outer surface configured to face away from the wind turbine blade. The device further comprises a supporting structure configured to support the plurality of air flow modifying elements. An angular distance between adjacent air flow modifying elements in cross-section is substantially constant.

According to this aspect, the three or more air flow modifying elements having a shape suitable for increasing drag of a vibration mitigating device may be arranged such that an angular distance between adjacent air flow modifying elements is substantially the same. This may help to stabilize the vibration mitigating device when mounted around a wind turbine blade and wind blows from different directions. Undesired behavior and instabilities induced by the wind blowing from different directions may be avoided or at least reduced. A response of the device to wind gusts coming from different directions may be more homogeneous. Therefore, wind turbine vibrations may be more effectively dampened.

Throughout this disclosure, an air flow modifying element may be understood as an element configured to significantly disturb an air flow, e.g. its magnitude and/or its direction, around a wind turbine blade. In particular, an air flow modifying element may be configured to significantly disturb an air flow before the air flow reaches a local surface of a wind turbine blade. For example, air flow, or a component of the air flow, moving towards a local blade surface in a direction substantially perpendicular to a length of the blade may encounter the air flow modifying element. An air flow modifying element may be configured to increase drag in oscillation.

Throughout this disclosure, an angular distance may be understood as an angle between the two imaginary lines joining a (geometric) center of a vibration mitigating device and two adjacent air flow modifying elements, in cross-section.

Throughout the present disclosure, the terms "standstill" and "parked" are used interchangeably, and may be understood as a situation in which the wind turbine is not producing electricity, and the rotor is substantially standing still. The rotor may or may not be locked in standstill. For instance, a wind turbine may be parked or in standstill during installation and/or commissioning. A wind turbine may also be parked for e.g. maintenance reasons after operating normally, i.e. producing energy, or in case of a prolonged grid loss.

Herein it may be understood that a wind turbine is in operation when its rotor is rotating at a speed high enough to produce energy and the generator of the wind turbine is producing electrical power.

In a further aspect of the disclosure, a method for mitigating vibrations of a parked wind turbine is provided. The method comprises moving a vibration mitigating device around a wind turbine blade and towards a root of the blade. The device comprises three or more air flow modifying elements, the air flow modifying elements comprising a concave outer surface configured to face away from the wind turbine blade, e.g. from a local surface of the blade when mounted to it. An angular distance between adjacent air flow modifying elements in cross-section is substantially constant. The method further comprises securing the device to the wind turbine.

Still in a further aspect of the disclosure, a device for mitigating vibrations of a parked wind turbine is provided. The device comprises three or more air flow modifying elements. The air flow modifying elements have a C-shaped or U-shaped cross-section. An opening of the C-shape or U-shape faces away from the wind turbine blade, e.g. from a local surface of the blade. The device further comprises a supporting structure configured to keep a substantially same distance between adjacent air flow modifying elements.

BRIEF DESCRIPTION OF THE DRAWINGS

FIGS. 6-9 and FIGS. 11-12B schematically illustrate cross-sections of a vibration mitigating device arranged around a wind turbine blade according to different examples;

DETAILED DESCRIPTION OF EXAMPLES

Reference now will be made in detail to embodiments, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
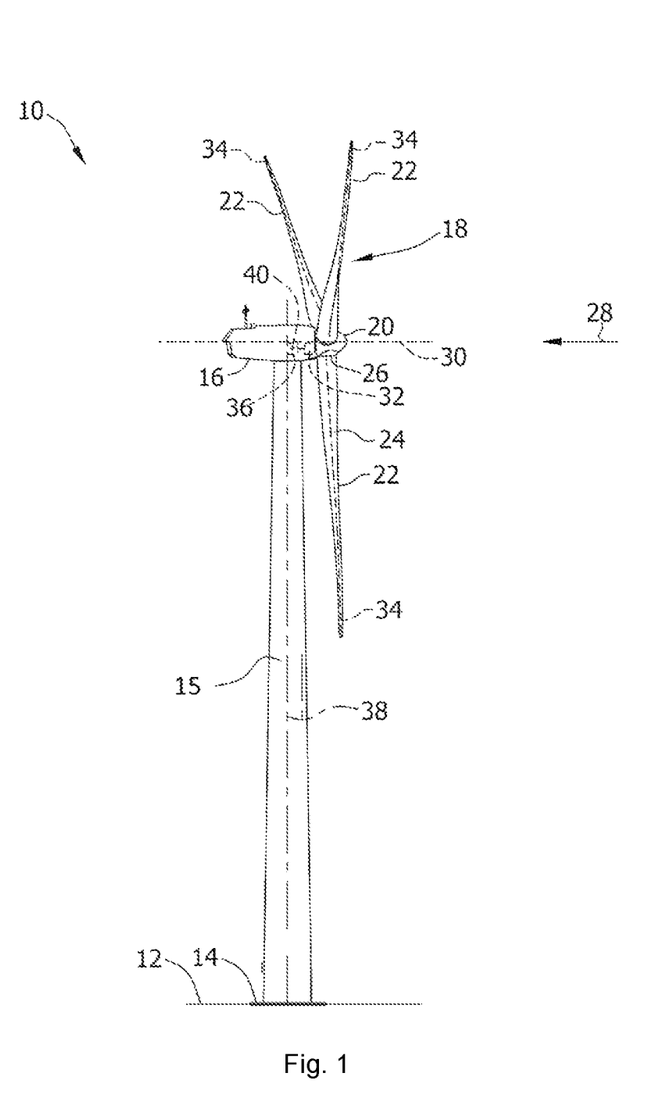
FIG. 1 illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
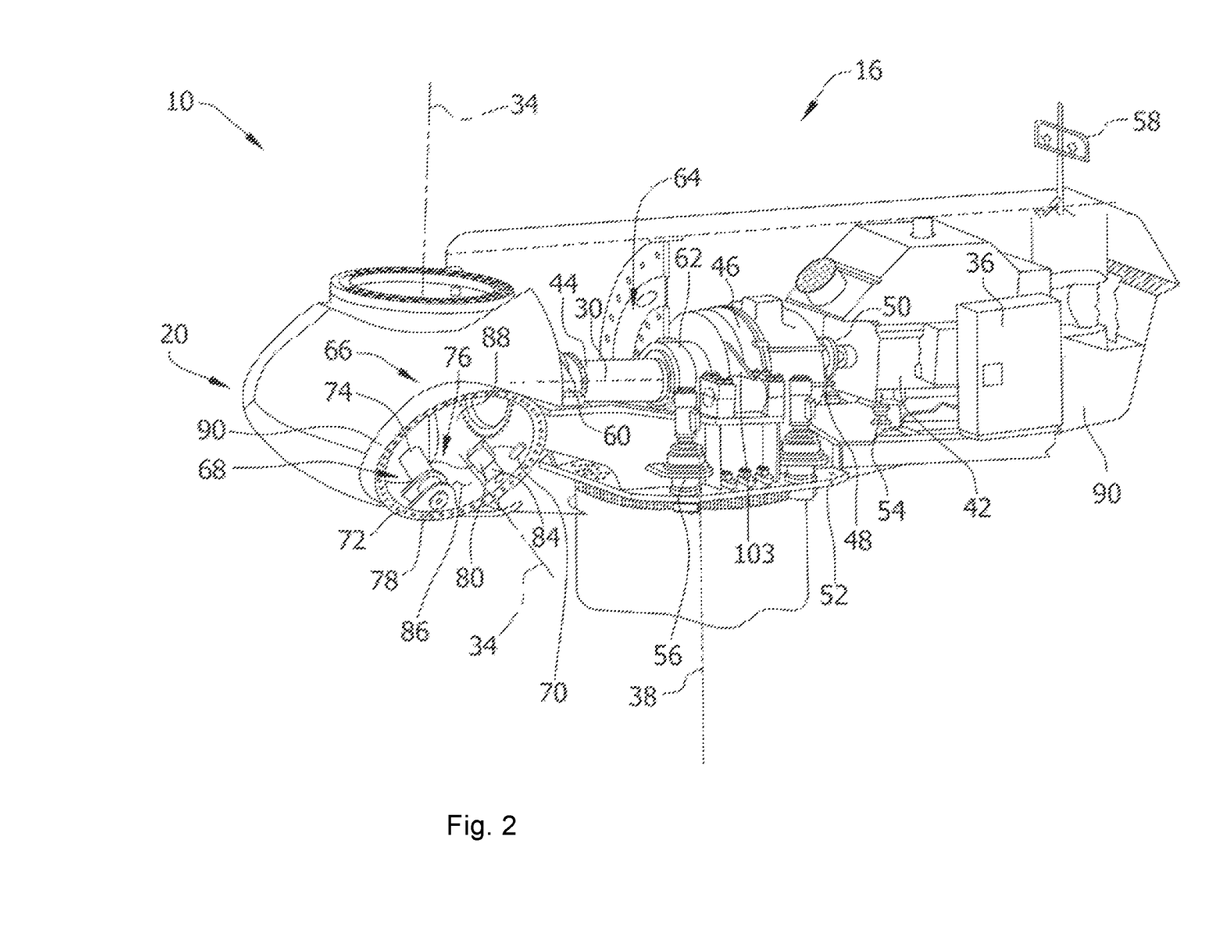
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
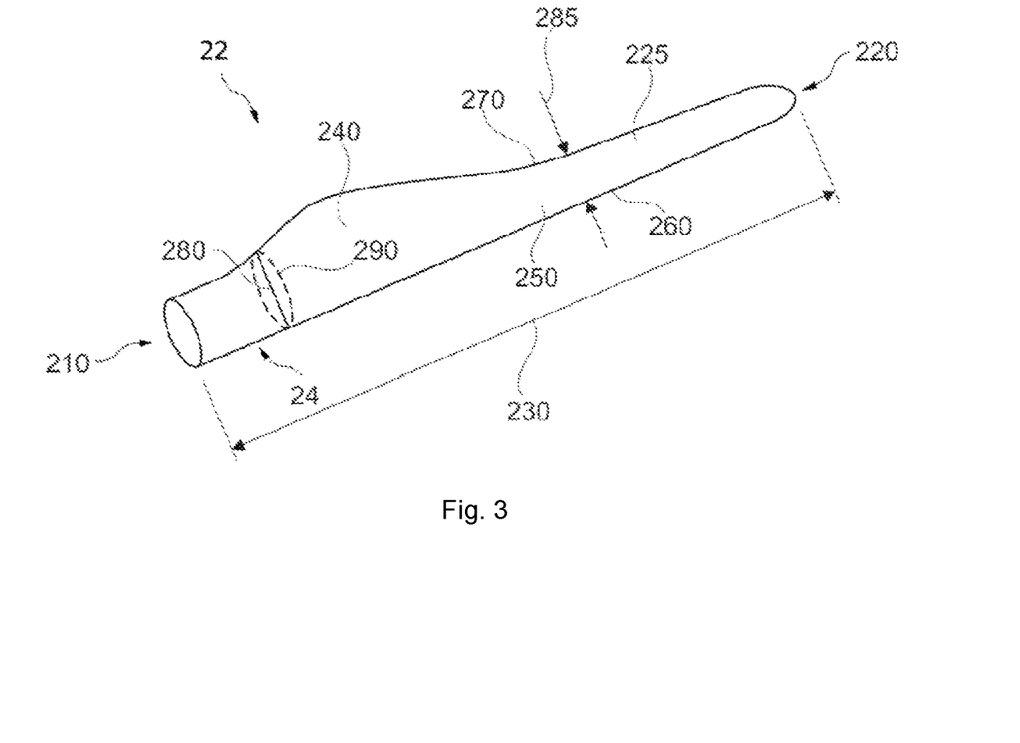
FIG. 3 illustrates a schematic perspective view of a wind turbine blade shown in FIG. 1.

A schematic perspective view of a wind turbine blade 22, e.g. one of the rotor blades 22 shown in FIG. 1, is illustrated as an example in FIG. 3. The rotor blade 22 includes a blade root 210, a blade tip 220, a leading edge 260 and a trailing edge 270. The blade root 210 is configured for mounting the rotor blade 22 to the hub 20 of a wind turbine 10. The wind turbine blade 22 extends lengthwise between the blade root 210 and the blade tip 220. A span 230 defines a length of the rotor blade 22 between said blade root 210 and blade tip 220. A chord 280 at a given position of the blade is an imaginary straight line joining the leading edge 260 and the trailing edge 270, the cross-section generally having airfoil shaped cross-section. As is generally understood, a chordwise direction is substantially perpendicular to a spanwise direction. Also, the chord 280 may vary in length 285 as the rotor blade 22 extends from the blade root 210 to the blade tip 220. The wind turbine blade 22 also includes a pressure side 240 and a suction side 250 extending between the leading edge 260 and the trailing edge 270. A tip region 225 may be understood as a portion of a wind turbine blade 22 that includes the tip 220. A tip region may have a length of 33%, 30%, or 25% of the span or less. A root region 24 may be understood as a portion of the blade that includes root 210. A root region may have a length of e.g. 33%, 30% of the span or less.

The rotor blade 22, at different spanwise positions, has different aerodynamic profiles and thus can have airfoil shaped cross-sections 290, such as a symmetrical or cambered airfoil-shaped cross-section. Close to a root of the blade, the cross-section of the blade may be rounded, even circular or almost circular. Closer to a tip of the blade, the cross-section of the blade may be thinner and may have an airfoil shape.

When a wind turbine is parked or stopped, vibrations caused by the air flowing around the wind turbine, in particular around the wind turbine blades, may stress and damage the wind turbine blades and the wind turbine. The wind turbine rotor may or may not be locked in these situations.

At least two types of oscillations or vibrations may happen particularly when the turbine is parked. The first ones are so-called vortex induced vibrations (VIVs), and these can arise when an angle of attack for a blade or airfoil portion is around 90 degrees. Vortex shedding may contribute to enhance the wind turbine blade oscillation. The second type of oscillations are stall induced vibrations (SIVs) which can arise when the angle of attack is close to stall angles (e.g. 15 degrees-30 degrees). The angle of attack may be understood as a geometrical angle between a flow direction of the wind and the chord of a rotor blade or a local chord of a rotor blade section.

Devices 300 as described herein may reduce vibrations when the wind turbine is parked. The performance of the wind turbine may not be negatively affected as the device(s) may be removed before the wind turbine starts normal operation. One or more devices 300 may be particularly useful during installation and/or commissioning of a wind turbine. It may be also useful if the wind turbine is stopped, e.g. for maintenance.

A vibration mitigating device 300 for mitigating vibrations of a parked wind turbine 10 is provided. The device 300 is configured to be arranged around a wind turbine blade 22. The vibration mitigating device 300 has a length 340 along a longitudinal direction 345 and a cross-section substantially perpendicular to the longitudinal direction 345. The cross-section includes a radial direction 343 and a tangential direction 342. The device comprises three or more air flow modifying elements 305 comprising a concave outer surface 323 configured to face away from the wind turbine blade 22. The device further comprises a supporting structure 310 configured to support the plurality of air flow modifying elements 305. An angular distance 307 between adjacent air flow modifying elements 305 in cross-section is substantially constant.

Figure 7:
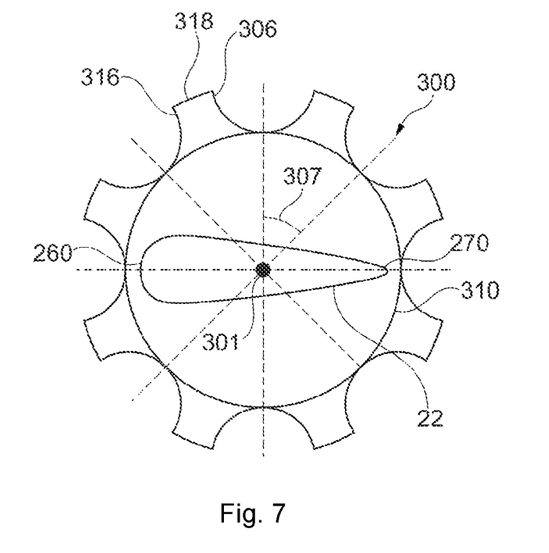

Having three or more air flow modifying elements 305 which are substantially equally spaced, in terms of angular separation 307 (see e.g. FIG. 7), around a wind turbine blade 22 in cross-section makes the behavior of the device independently from the wind direction. The device 300 may therefore be capable of satisfactorily reducing wind turbine vibrations for more incoming directions of the wind, which may increase the effectives in vibration mitigation. A device 300 which may react similarly regardless the blowing direction of the wind may enable a more predictable and stable behavior than other devices, e.g. a device with only two air flow modifying elements 305 or a device with three or more air flow modifying elements which have different angular separations 307 of adjacent elements 305 in cross-section. In particular, effects of torsional loads caused by the device 300 may be avoided or reduced. Thus, undesired or unexpected behaviors of the device 300 may also be reduced. In addition, more drag, and therefore more damping, may be obtained, e.g. when compared to a device with only one or two modifying elements. A concave outer surface 323 of the air flow modifying elements 305, e.g. a surface 323 having a U-shape or C-shape in cross-section, may be particularly suitable for increasing drag.

Figure 4:
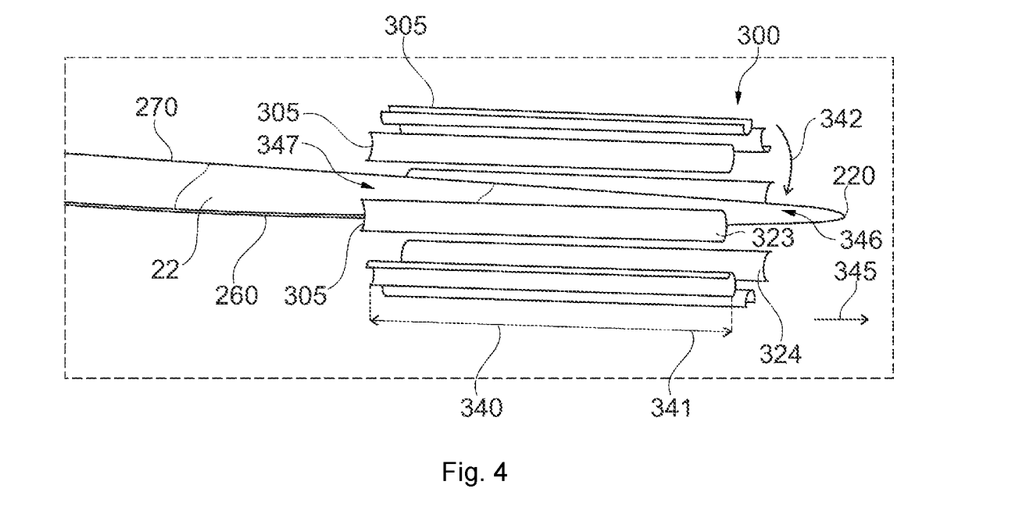
FIG. 4 schematically illustrates a perspective view of a plurality of air flow modifying elements of a vibration mitigating device according to one example arranged around a wind a turbine blade.
Figure 5:
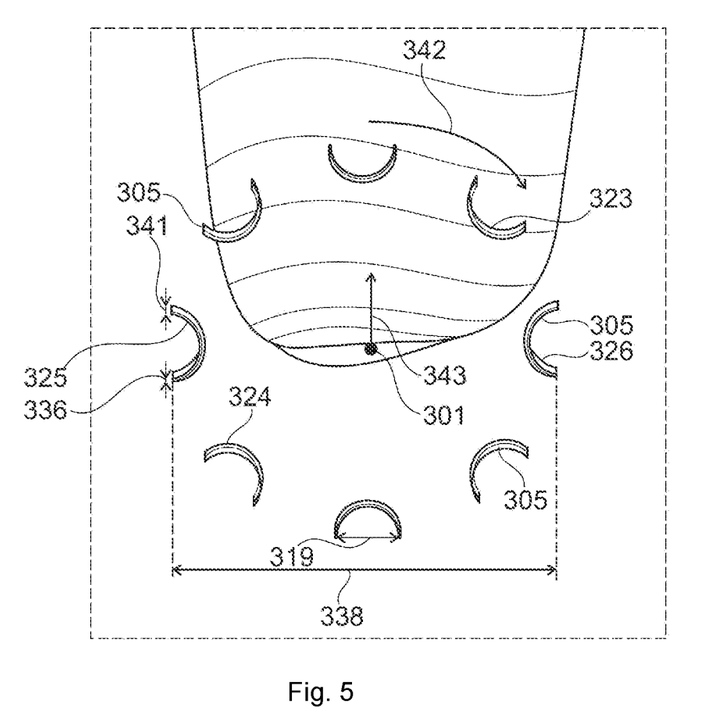
FIG. 5 schematically illustrates a perspective view of a plurality of air flow modifying elements of a vibration mitigating device according to another example close to a wind a turbine blade.

FIG. 4 and FIG. 5 schematically illustrate a perspective view of two examples of the air flow modifying elements 305 of a vibration mitigating device 300. In these figures, a supporting structure 310 for supporting the air flow modifying elements is not shown. In the example of FIG. 4, the device 300 is arranged around a wind turbine blade 22, in particular around a tip region 225 of the blade 22. In general, all the devices 300 disclosed herein may be arranged around a tip region 225 of a wind turbine blade 22. In FIG. 5, the device 300 is being moved such that it may surround a tip 220 of the blade 22.

In some examples, a length 341 of all the air flow modifying elements along a longitudinal direction 345 may be substantially the same, e.g. as in FIG. 4. In addition, in FIG. 4, a length 340 of the device 300 is substantially equal to a length 341 of the air flow modifying elements 305. In other examples, different air flow modifying elements 305 may have different lengths along a longitudinal direction 345 of the device. When mounted around a wind turbine blade 22, a longitudinal direction 345 of the device 300 may be substantially parallel to a spanwise direction of the blade 22.

A width 338 of the device 300 may be measured along a radial direction 343. If the device has a substantially circular cross-section, as e.g. in the examples of FIGS. 4-8, the width 338 may be a diameter of the device 300. If the device has a substantially elliptic cross-section, as e.g. in the example of FIG. 9, a width of the device may be measured e.g. along a major axis of the ellipse. Also, in the examples where the vibration mitigating device 300 comprises a substantially circular cross-section, e.g. such as in FIGS. 4-8, a tangential direction 342 may be referred to as a circumferential direction 342.

In some examples, a vibration mitigating device 300 may have a substantially cylindrical, conical or truncated-conical shape. In some examples, the device 300 may be configured, when mounted around a blade 22, to taper towards a blade tip 220. In other examples, e.g. as in FIGS. 4 and 5, the device 300 has a cylindrical shape. A cylindrical shape may increase the independence of the reaction of the device 300 when subjected to winds coming from different directions.

In some examples, an inner surface 324 of the air flow modifying elements 305 may be convex, see e.g. FIGS. 4 and 5. An outer surface 323 of an air flow modifying element may be understood as the concave surface of the air flow modifying element which is configured to face away from a local blade surface and which is configured to be the farthest from a local blade surface, e.g. farther away than an inner surface 324 of the air flow modifying element. An inner surface 324 of an air flow modifying element may be understood as the surface of the air flow modifying element which is configured to be the closest to a local blade surface. The inner surface 324 may have other shapes, e.g. a substantially planar or flat shape.

The air flow modifying elements 305 may be configured to keep their shape, e.g. a C-shape or U-shape in cross-section, when in use. In some examples, the air flow modifying elements may comprise one or more plastics. A plastic may confer certain stiffness, i.e., a certain resistance to deformation in response to an applied force, to the air flow modifying elements such that their shape is maintained. In other examples, the air flow modifying elements 305 may comprise a textile-based cover such as a cloth or tarp attached to a portion of a suitable supporting structure 310, e.g. to one or more rails. The rails may extend along a longitudinal direction 345. The one or more rails may be substantially straight. In some examples, a thickness 336 of the air flow modifying element 350 (see e.g. FIG. 5) may be negligible or very small in comparison to its length 341 and its width 319. Still in other examples, the air flow modifying elements 305 may be made of foam. For example, the air flow modifying element of FIG. 10A may be made of foam.

Figure 10A:
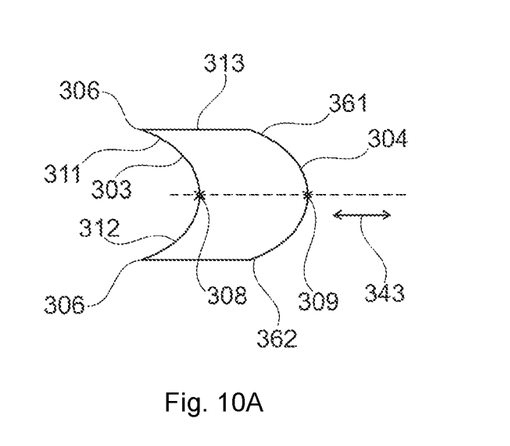
FIGS. 10A and 10B schematically illustrate two examples of an air flow modifying element in cross-section.
Figure 10B:
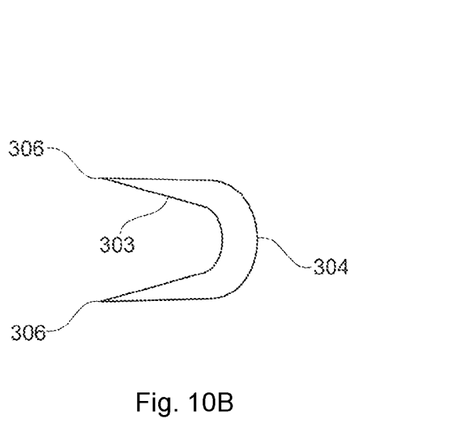

The materials and curvature of the air flow modifying elements 305 may be adapted for obtaining light weight elements for effectively mitigating wind turbine vibrations. A curvature of the outer surface 303 of the air flow modifying elements 305 may be increased for increasing the damping capability of the device. For instance, the air flow modifying element of FIG. 10B, which has an outer surface 323 with a bigger curvature than an outer surface 323 of the air flow modifying element of FIG. 10A, may be more effective for mitigating VIVs and/or SIVs. Herein, a curvature may be understood as an amount by which a curve deviates from being a straight line, or by which a surface deviates from being a plane. As FIGS. 10A and 10B are cross-sections of two air flow modifying elements 305, an outer edge 303 and an inner edge 304 can be seen instead of an outer surface 323 and an inner surface 324.

In some examples, all the air flow modifying elements 305 of a device 300, in cross-section, have a substantially same shape and size. This may help to obtain a reaction of the device 300 which is more independent from the direction, e.g. a radial direction 343, in which the wind blows towards the blade 22. In some of these examples, e.g. in the examples of FIGS. 6-9, each of the air flow modifying elements 305 of the vibration mitigating device 300 may be substantially symmetric about a radial direction 343, see e.g. elements 313 in FIGS. 8 and 10A. Symmetry and a homogeneous response of the device to wind blowing towards a local blade surface may be further enhanced. In some examples, all the air flow modifying elements 305 may further have a same length along a longitudinal direction 345, as for example in FIGS. 4 and 5. In these examples, all the air flow modifying elements 305 of the device 300 are substantially the same.

In some examples, the air flow modifying elements 305 may contact adjacent air flow modifying elements. In some of these examples, e.g. as in FIG. 6, an outer end 306 of a first air flow modifying element and an outer end 316 of a second adjacent air flow modifying element are separated by a tangential air gap 317, i.e. a gap 317 along the tangential direction 342. Such an air gap 317 may help to reduce vortex sheddings caused by the device 300 itself. In some other examples, the outer ends 306, 316 of two adjacent air flow modifying elements 305 may touch. For example, the air flow modifying elements could be configured such that the outer ends 306, 316 of two adjacent air flow modifying elements touch, as e.g. in FIG. 12B. In some examples, the outer ends 306, 316 of two adjacent air flow modifying elements may be joined, in cross-section, by a segment 318.

Figure 8:
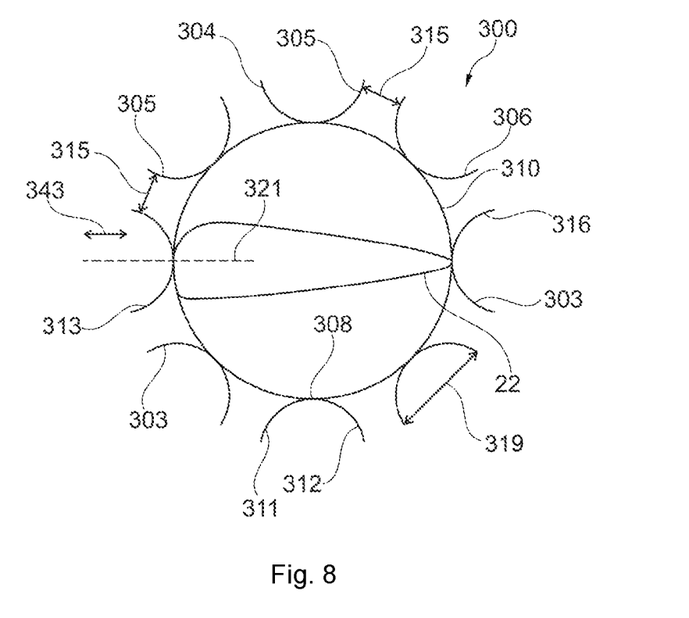

In some examples, the air flow modifying elements 305 may be completely separated from adjacent air flow modifying elements by a tangential air space 315, i.e. by a space 315 along a tangential direction 342, see e.g. FIG. 8. I.e., there is no contact between adjacent elements along the tangential direction 342. A tangential air space 315 may help to decrease vortex sheddings caused by the vibration mitigating device 300 itself.

In some examples, a distance 315 between two consecutive air flow modifying elements along a tangential direction is less than twice, and in particular less than once, a width 319 of an air flow modifying element. A width 319 of an air flow modifying element may be measured in cross-section between the two outer ends 306 of the element, see e.g. FIG. 8. Having such an air space 315 may provide a suitable balance between maximizing the drag due to the concave shape of the outer surfaces 323 of the air flow modifying elements 305 and minimizing vortex sheddings caused by the vibration mitigating device 300. Such a tangential air space 315 may be measured between two adjacent outer ends 306, 316 of two adjacent air flow modifying elements 305.

Figure 6:
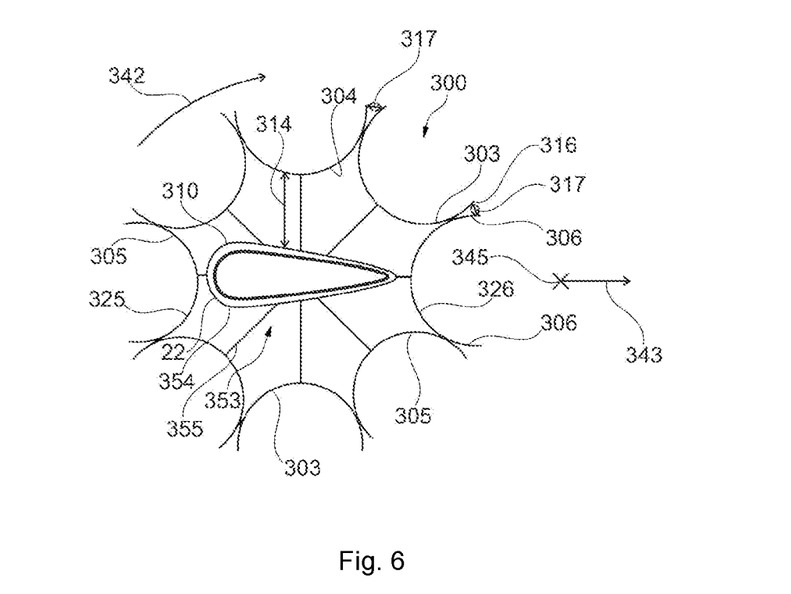

In some examples, a first air flow modifying element 325 may be configured to be arranged in front of a leading edge 260 of the wind turbine blade 22 and a second air flow modifying element 326 may be configured to be arranged behind a trailing edge 270 of the wind turbine blade 22, see e.g. FIGS. 5 and 6. Arranging two air flow modifying elements in this way may particularly help to mitigate edgewise vibrations.

In these examples, an even number of air flow modifying elements 305, the number being four or more, may be used. For instance, as shown in FIGS. 4-9, eight air flow modifying elements may be used. In other examples, a different number of air flow modifying elements may be used, e.g. four, six, ten, or more. In other examples where two air flow modifying elements are not configured to be arranged, respectively, in front of a leading edge 260 and behind a trailing edge 270, an even number or an odd number of air flow modifying elements may be provided. For example, three, four, five, six or more air flow modifying elements may be provided.

Figure 11:
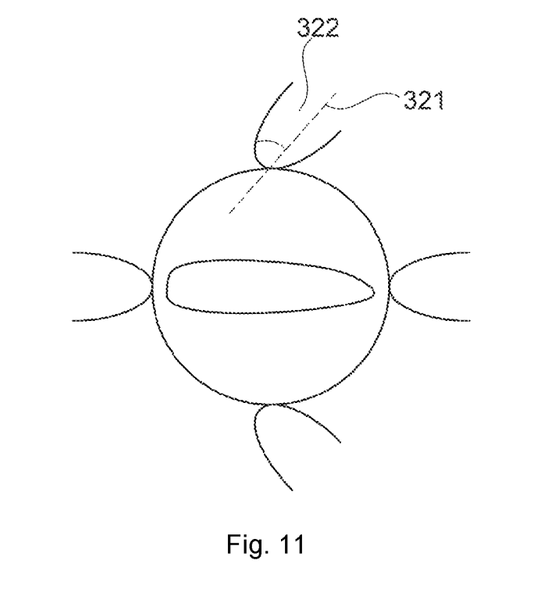

In some examples, a radial axis of symmetry 321 of at least one or more air flow modifying elements 305 in cross-section may lie in a different direction than a corresponding local radial direction 343, see e.g. FIG. 11. In other words, one or more, including all, the air flow modifying elements may be tilted with respect to a radial direction 343. In some of these examples, an angle of tilt 322 may be between 0° and 20°, in particular smaller than 10° and more specifically smaller than 5°.

Figure 12A:
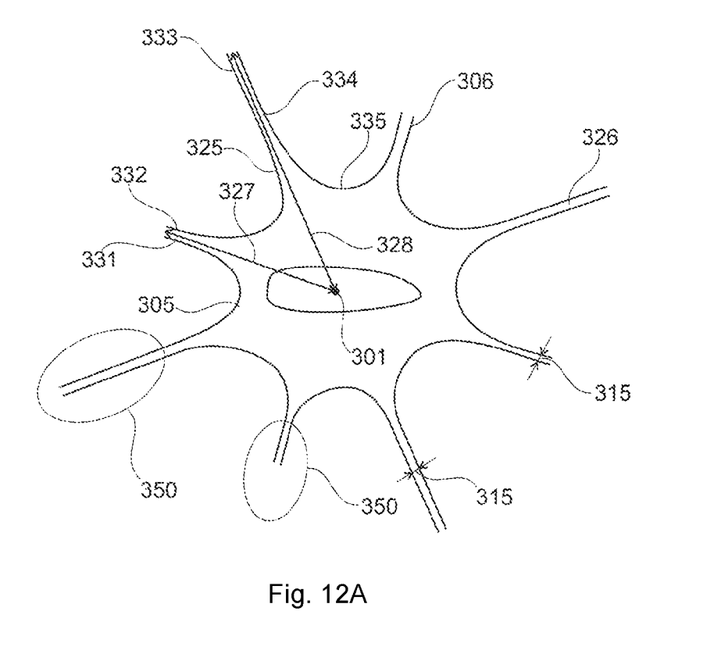
Figure 12B:
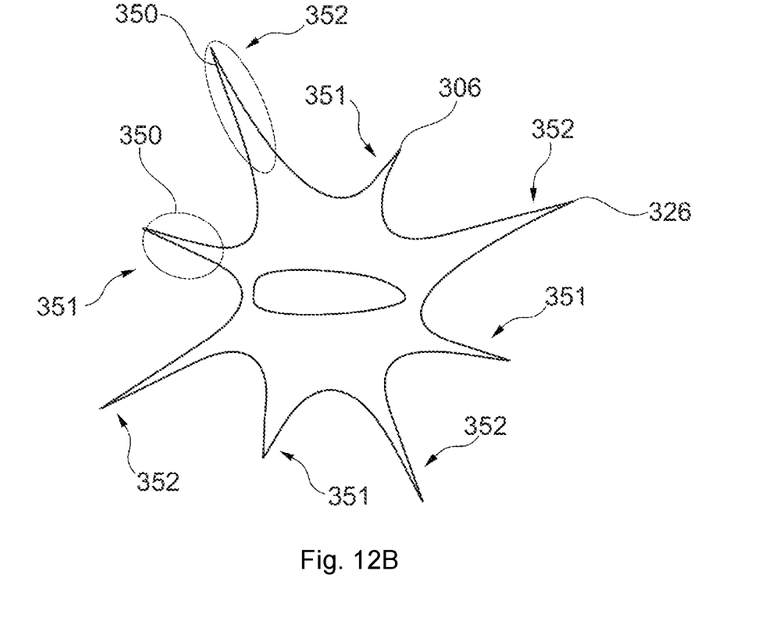

In some examples, in cross-section, a first outer end 306 of an air flow modifying element 305 may be configured to protrude away from a local blade surface more than a second outer end 316 of the air flow modifying element, see e.g. FIGS. 12A and 12B. Even though effective damping may be provided regardless of the wind direction, damping in individual directions may be tailored by introducing these irregularities. E.g. in some examples, the arrangement and dimensions of the air flow modifying elements may be adapted to increase damping in the edgewise direction.

In some examples, when advancing along a tangential direction 342, adjacent outer ends 331, 332 of a first air flow modifying element 305 and a second air flow modifying element 325 adjacent to the first air flow modifying element may be configured to have a first radial distance 327 to a center 301 of the device. Adjacent outer ends 333, 334 of the second air flow modifying element 325 and a third air flow modifying element 335 adjacent to the second air flow modifying element 325 may be configured to have a second radial distance 328 to a center 301 of the device that is larger than the first distance 327. The first 305, second 325 and third 335 air flow modifying elements are different elements.

In cross-section, an outer edge 303 of an air flow modifying element with a U shaped or C-shaped cross section may comprise an outer valley point 308 and two outer arms 311, 312. An outer valley point 308 may be understood as the point of the outer edge 303 which is closest to a center 301 of the device in cross-section. In some examples, a radial axis of symmetry 321 of an air flow modifying element passes through the outer valley point 308. The two outer arms 311, 312 may meet at the valley point 308. Two adjacent outer arms 331, 332 of adjacent air flow modifying elements 305, 325 may form a spike 350. The outer ends of two adjacent outer arms forming a spike 350 may have a substantially same radial distance 327, 328 to a center 301 of the device. In some of these examples, as e.g. in FIG. 12B, the outer ends of a spike 350 touch.

In some of these examples, when advancing along a tangential direction 342, consecutive spikes may have alternating distances to a center 301 of the device in cross-section. A first group of spikes 351 may have a first radial distance 327 to a center of the device in cross-section and a second group of spikes 352, which are displaced along the tangential direction 342 from the first group of spikes 351, may have a second radial distance 328 to the center 301 of the device bigger than the first distance 327, see e.g. FIGS. 12A and 12B.

In some examples, a radial distance between each of the air flow modifying elements 305 and a center 301 of the vibration mitigating device 300, in cross-section, may be substantially the same. I.e., all the air flow modifying elements 305 may have a same distance to a center 301 of the device in cross-section. A radial distance may be measured in cross-section between a center 301 of the device and a valley point 308 of an outer edge 303 of an air flow modifying element in some examples. In other examples, a radial distance may be measured in cross-section between a center 301 of the device and a valley point 309 of an inner edge 304 of an air flow modifying element. A valley point 309 of an inner edge 304 may be understood as the point of the inner edge 304 which is the closest to a center 301 of the device in cross-section, see e.g. FIG. 10A. An inner edge 304 may have two inner arms 361, 362 which may meet at the inner valley point 309. The inner arms 361, 362 may meet the outer arms 311, 312 at the outer ends 306 of the air flow modifying element 305, see e.g. FIG. 10A.

In some examples, one or more air flow modifying elements 305, including all the air flow modifying elements, may be configured to change between a retracted configuration and an extended configuration. For instance, they may be configured to extend and retract along a longitudinal 345 direction of the device 300. In some examples, the air flow modifying elements 305 may comprise a textile-based cover such as a cloth or tarp movably attached to one or more rails. The rails may extend along a longitudinal direction 345.

Retractable and extendable air flow modifying elements 305 of a vibration mitigating device 300 may help to adapt how much or to which extent a surface of an air flow modifying element which is exposed to the wind. Therefore, control of the device when carrying (e.g. hoisting) it to a blade 22 of a parked wind turbine 10 may be enhanced, and/or when transporting or hoisting the blade carrying such a device.

It may be particularly beneficial to carry the device in a retracted configuration for reducing a risk of damage to the device 300 as well as to wind turbine 10, e.g. a wind turbine tower 15 or a wind turbine blade 22. Control of the device once installed on the blade 22 may also be enhanced. If more vibration mitigation is required, one or more air flow modifying elements 350 of the device 300 may be further extended if they are not yet fully extended. If the device 300 and/or the wind turbine 10 is subjected to unexpected or undesired loads or vibrations, one or more air flow modifying elements 305 may be retracted for attenuating the undesired vibrations and/or stresses. Removing a vibration mitigating device 300 from the blade may therefore be avoided or may be necessary less frequently. This may increase the efficiency in reacting to potential dangerous or unwanted conditions. This may further facilitate activating the device 300, i.e. extending the air flow modifying elements 305 of the device 300, once the risky or undesired events have ended.

Throughout this disclosure, a retracted configuration of an air flow modifying element 350 may mean that the air flow modifying element has a configuration in which one or more of its dimensions, i.e. length 341, width 319 and/or thickness 336, are smaller than in an extended configuration. For example, a length 341 of an air flow modifying element 305 along a longitudinal direction 345 of the air flow modifying element may be increased in an extended configuration of the air flow modifying element compared to its length 341 in a retracted configuration. In these or other examples, a width 319 of an air flow modifying element may be increased in an extended configuration of the air flow modifying element compared to a retracted configuration of the air flow modifying element.

Figure 13A:
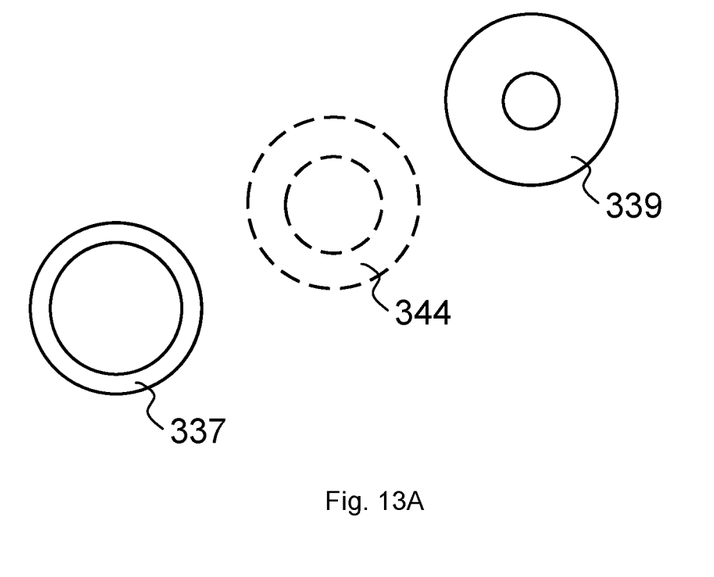
FIG. 13A schematically illustrates a perspective view of an example of supports for supporting three or more air flow modifying elements.

In some examples, the supporting structure 310 may comprise a tip support 339 and a root support 337, see e.g. FIG. 13A. It may be understood that a tip support 339 is configured to be closer to a tip 220 of the blade 22 than a root support 337 when the vibration mitigating device 300 is mounted around the blade 22. Likewise, it may be understood that a root support 337 is configured to be closer to a root 210 of the blade 22 than a tip support 339 when the device 300 is mounted around the blade 22. In some examples, the supporting structure 310 may comprise one or more intermediate supports 344 between the tip support 339 and the root support 337. In these or other examples, one or more rails may extend between the tip support 339 and the root support 337.

In some examples, a tip support 339 may be provided at or near a first longitudinal end 346, e.g. a tip end 346, of the device 300. A root support 337 may be provided at or near a second longitudinal end 347, e.g. a tip end 347, of the device.

In some examples, the tip 339 and root 337 supports, and optionally the intermediate supports 344 if present, may have a circular or elliptic cross-section. For instance, an outer edge of the supports, in cross-section, may be substantially circular or elliptic. An inner edge of the supports, in cross-section, may be substantially circular in some examples and may be configured to adapt to a blade profile in some other examples. In some examples, the root 337 and tip 339 supports may be inflatable.

Figure 13B:
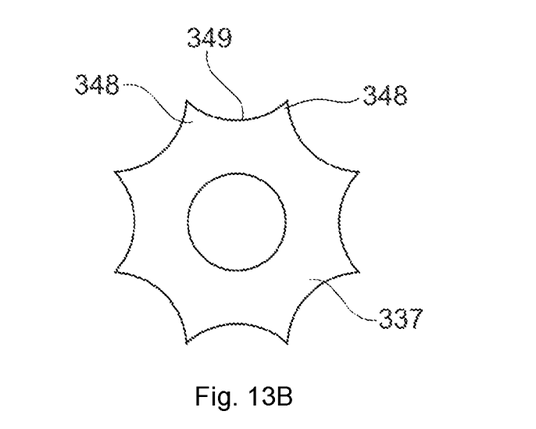
FIG. 13B schematically illustrates a front view of an example of a support for supporting three or more air flow modifying elements.

In some examples, the tip and the root supports may comprise one or more protrusions 348 extending outwardly, see e.g. FIG. 13B. The protrusions 348 may be configured to extend away from a local wind turbine blade surface when the device 300 is mounted to the blade 22. An external edge 349 of the support comprising two adjacent protrusions may be concave, e.g. it may form a C- or U-shape in cross-section. In some examples, one or more rails (not shown) extending between the tip 339 and root 337 supports may be attached to the concave exterior edges of the tip and root supports. The one or more rails may be substantially straight.

Figure 9:
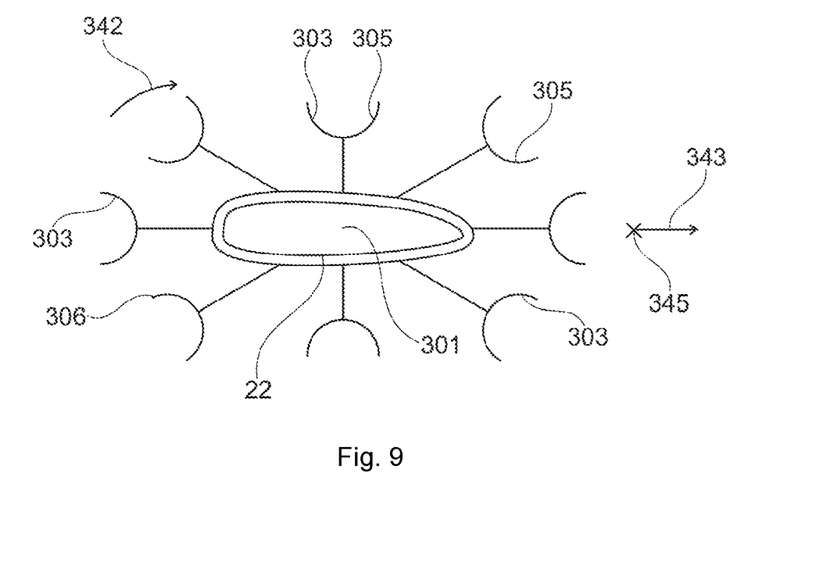

In some examples, the supporting structure 310 may comprise a supporting sleeve 353 configured to surround a wind turbine blade 22 and to support the air flow modifying elements 305, see e.g. FIGS. 6 and 9. A supporting sleeve may comprise a flexible base sleeve 354 configured to be fitted around the wind turbine blade 22, e.g. to wrap the blade, and three or more sleeve protrusions 355 configured to support the air flow modifying elements 305.

In some examples, sleeve protrusions 355 may include at least one of plate-like protrusions and rib-like protrusions extending outwardly from the base 354. Rib-like protrusions may include rods, bars or similar elements. Other kind of protrusions 355 may be used in other examples. The number and type of protrusions used may be adapted to the air flow modifying elements 305 of the device, e.g. to the material of which they are made of and to their shape and dimensions. The base 354 of the sleeve may help to protect serrations on the trailing edge 270 of a blade 22.

In some examples, a supporting structure 310 of the vibration mitigating device 300 may be stiff enough for keeping the air flow modifying element(s) separated from a blade surface. For instance, the tip 339 and root 337 supports, and the sleeve protrusions 355 may be rigid enough such that, when the device is in use, they are able to keep a substantially same or similar shape as when mounted around a blade 22.

In some examples, the vibration mitigating device 300 may be configured to provide a radial gap 314, see e.g. FIG. 6, between one or more air flow modifying elements 305 and a local surface of the wind turbine blade 22 when the device is mounted to the blade 22. I.e., a radial gap 314 may be provided between the totality of an air flow modifying element and a corresponding blade surface below the air flow modifying element. This may increase drag. The supporting structure 310 may be configured to separate the one or more air flow modifying elements 305 from a local blade surface, e.g. by having a certain size and/or by having protrusions.

A wind turbine blade 22 comprising one or more vibration mitigating devices 300 as described herein is also provided. In some examples, a wind turbine blade 22 comprises one vibration mitigating device 300 arranged around a tip region 225 of the blade 22. A parked wind turbine 10 comprising a tower 15, a nacelle 16, a hub 20 and one or more blades 22, at least one of the blades 22 comprising a vibration mitigating device 350 is also provided.

Figure 14:
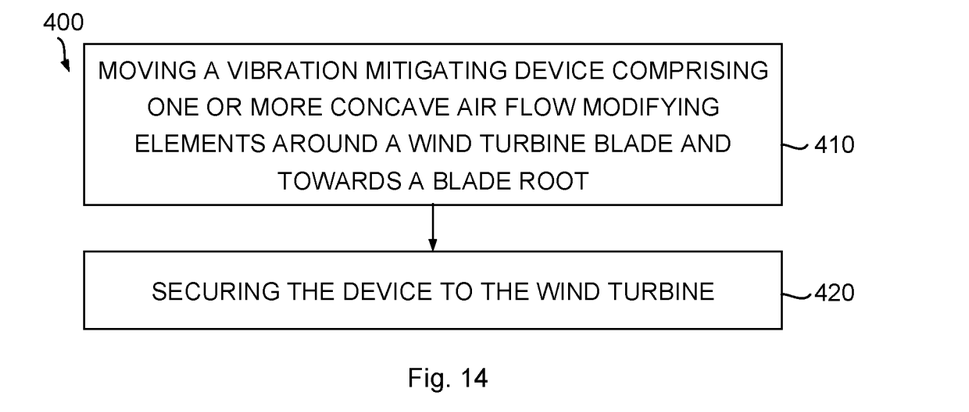
FIG. 14 shows a flow chart of a method for mitigating wind turbine vibrations.

In a further aspect of the disclosure, a method 400 for mitigating vibrations in a parked wind turbine 10 is provided. The method, which is schematically illustrated in FIG. 14, may be particularly used during installation and/or during commissioning of the wind turbine 10. The method may also be used when the wind turbine is stopped after it has been operating (i.e. producing energy), e.g. during maintenance or repair.

The method comprises, at step 410, moving a vibration mitigating device 300 around a wind turbine blade 22 and towards a root 210 of the blade 22, the device 300 comprising three or more air flow modifying elements 305 comprising a concave outer surface 323 configured to face away from the wind turbine blade 22, e.g. from a local surface of the blade when mounted to it. An angular distance 307 between adjacent air flow modifying elements 305 in cross-section is substantially constant. The device 300 may be any device as described herein.

In some examples, the device 300 may be moved by pulling one or more ropes attached to the supporting structure 310, e.g. to a root support 337.

In some examples, the device 300 may be moved towards the blade root 210 until an internal surface of the tip support 339 touches a surface of the blade 22 and it gets stuck, and therefore cannot keep its movement towards the root 210. In some examples, the device 300 may be configured such that, when its tip support 339 contacts a local blade surface and gets stuck, the root support 337 also touches a local blade surface.

In some examples the device 300 may be mounted to a wind turbine blade 22 in a rotor 18 already placed on top of the tower 15. In some of these examples, the one or more ropes may be lowered from a hub 20 or a nacelle 16 and then attached to the supporting structure 310. The wind turbine blade 22 on which the device 300 is going to be arranged may be pointing downwards, i.e. it may substantially be at a six o'clock position. If the blade 22 is at a different position, the rotor 18 may be rotated to make the blade to point downwards. The device 300 may be mounted to a blade 22 at a different position, e.g. by using an additional rope attached to a tip end of the device to help to lift the device. But it may be easier and faster to install the device 300 with the blade 22 pointing downwards.

In some other examples, a vibration mitigating device 300 may be installed and uninstalled using one or more drones, e.g. at least two drones. The drones may be connected to a device 300 by one or more ropes. The drones may carry the device 300 towards a blade 22, e.g. from a ground 12, a nacelle 16 or a hub 20, and cause the device to surround a wind turbine blade 22.

The device 300 may be also installed around a blade 22 which is yet to be attached to the wind turbine rotor 18. In these examples, a lifting device such as a crane may lift the blade such that the tip 220 is pointing downwards. The device 300 may then be moved, e.g. slid, around the blade upwardly by pulling one or more ropes.

The method further comprises, at step 420, securing the device 300 to the wind turbine 10. For example, the device may be secured to a wind turbine blade surface, to a nacelle 16 or to a hub 20.

Securing may include attaching the one or more ropes to the wind turbine. Attachment of the one or more ropes may keep the device 300 in place and avoid that it falls down, e.g. by sliding towards a blade tip 220. In some examples, the ropes may be attached to a portion of the blade 22. For example, the blade 22 may include one or more anchor points to which the ropes may be attached. In other examples, the ropes may be attached to the hub 20 or the nacelle 16.

In some examples, if one or more air flow modifying elements 350 are in a retracted configuration, the method may further include changing the retracted configuration to an extended configuration. For example, once the vibration mitigating device 300 is secured, the air flow modifying elements 305 may be extended. In some other examples, they may be extended before the device 300 is secured, e.g. once the device is around a tip portion 225 of a wind turbine blade, but before the device is secured.

In some examples, extending at least an air flow modifying element 305 may comprise moving at least the air flow modifying element 305 along one or more rails. Extension of an air flow modifying element may be performed towards a blade tip 220 and/or a blade root 210 in some examples.

If the device 300 is mounted on an uninstalled blade 22, the method may further comprise installing the wind turbine blade 22. The blade 22 may be first attached to the hub 20 and the hub 20 and the blade 22 may be lifted together, or the hub 20 may be mounted up tower first and then the blade 22 with the device 300 may be lifted and connected to the hub 20.

Once a blade 22 installed up tower comprises a device 300, the rotor 18 may be rotated for mounting another device 300 on another blade 22 or for attaching another blade 22 with a mounted device 300. If drones are used, this may not be avoided as the devices 300 may be mounted at overlapping time periods on different blades.

Once a wind turbine 10 comprises one or more blades 22 with one or more devices 300 installed, the devices 300 may reduce wind turbine vibrations, e.g. vortex induced vibrations and/or stall induced vibrations.

The device 300 may stay mounted around the blade 22 until operation of the wind turbine is started or resumed. The method may further comprise removing the device 300 from the wind turbine blade 22 before starting or resuming operation. If more than one device 300 is installed, all of them may be removed before starting or resuming operation.

Removing a device 300 may comprise detaching the one or more ropes and letting the device 300 fall by the action of gravity. The blade 22 may be pointing downwards, i.e. the blade may be at a substantially six o'clock position. If the blade 22 is not in this position, the rotor 18 may be rotated to put the blade 22 pointing downwards. A device 300 may be used more than once in a same or a different wind turbine.

If one or more drones are used to uninstall the devices, the drones may carry them to a ground, hub or nacelle in some examples.

According to a further aspect of the disclosure, a vibration mitigating device 300 for mitigating vibrations of a parked wind turbine 10 is provided. The device comprises three or more air flow modifying elements 305. The air flow modifying elements 305 have a substantially C-shaped or U-shaped cross-section. An opening of the C-shape or U-shape faces away from the wind turbine blade 22. The device 300 further comprises a supporting structure 310 configured to keep a substantially same distance between adjacent air flow modifying elements 305.

A device according to this aspect may be any device as described herein. For example, a device according to this aspect may incorporate one or more details illustrated in FIGS. 4-13B. In general, the previous explanations with respect to FIGS. 4-13B may apply to the device of this aspect as well. Likewise, details of this aspect may be applicable to the previous aspects too. A device according to this aspect may be installed and uninstalled as explained previously in the present disclosure.

In some examples, the supporting structure 310 is further configured to maintain a substantially constant distance between the air flow modifying elements and a geometric center 301 of the device 300 in cross-section.

In some examples, two adjacent air flow modifying elements 305 may be separated by a tangential air space 315.

In some examples, the device 300 comprises an even number of air flow modifying elements 305, in particular four or more air flow modifying elements.

In some of these examples, a first air flow modifying element is configured to be positioned in front of a leading edge 360 of the blade 22 and a second air flow modifying element is configured to be positioned behind a trailing edge 270 of the blade 22.

In some examples, the supporting structure 310 comprises at least a tip support 339 and a root support 337 to which the air flow modifying elements 305 are attached. The root and tip supports may be hoops in some examples.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A device for mitigating vibrations of a parked wind turbine, the device configured to be arranged around a blade of the wind turbine, comprising:

a length along a longitudinal direction and a cross-section perpendicular to the longitudinal direction, the cross-section including a radial direction and a tangential direction;

three or more air flow modifying elements comprising a concave outer surface configured to face away from the blade;

a supporting structure configured to support the air flow modifying elements; and a constant angular distance in cross-section between adjacent air flow modifying elements.

2. The device of claim 1, wherein an inner surface of the air flow modifying elements is convex.

3. The device of claim 1, wherein the air flow modifying elements, in cross-section, comprise a same shape and size.

4. The device of claim 1, wherein each of the air flow modifying elements contact an adjacent one of the air flow modifying elements.

5. The device of claim 4, wherein an outer end of a first air flow modifying element and an outer end of a second adjacent air flow modifying element are separated by a tangential air gap.

6. The device of claim 1, wherein each of the air flow modifying elements is completely separated from adjacent ones of the air flow modifying elements by a tangential air space.

7. The device of claim 1, wherein a first air flow modifying element is configured to be arranged in front of a leading edge of the blade and a second air flow modifying element is configured to be arranged behind a trailing edge of the blade.

8. The device of claim 1, wherein a radial axis of symmetry of at least one of the air flow modifying elements in cross-section lies in a different direction than a corresponding local radial direction.

9. The device of claim 1, wherein the device is configured to provide a radial gap between the air flow modifying elements and a local surface of the blade when the device is mounted to the blade.

10. The device of claim 1, wherein the supporting structure comprises a tip support and a root support, the tip support configured to be closer to a blade tip of the blade than the root support.

11. A wind turbine blade comprising the device for mitigating vibrations of a parked wind turbine according to claim 1.

12. A method for mitigating vibrations in a parked wind turbine, the method comprising:

moving a vibration mitigating device around a blade of the wind turbine and towards a root of the blade, wherein the device includes three or more air flow modifying elements each having a concave outer surface configured to face away from the blade, and wherein an angular distance between adjacent ones of the air flow modifying elements in cross-section is constant; and securing the device to the blade.

13. The method of claim 12, wherein the moving comprises pulling one or more ropes attached to a supporting structure of the device.

14. The method of claim 12, wherein the blade is pointing downwards.

15. The method of claim 12, further comprising removing the device from the wind turbine blade before starting or resuming operation.

16. A device for mitigating vibrations of a parked wind turbine, the device configured to be arranged around a blade of the wind turbine, comprising:

three or more air flow modifying elements, each of the air flow modifying elements comprising a C-shaped or U-shaped cross-section;

wherein an opening of the C-shaped or U-shaped cross section faces away from the blade; and a supporting structure configured to keep a same distance between adjacent ones of the air flow modifying elements.

17. The device of claim 16, wherein the supporting structure is further configured to maintain a substantially constant distance between the air flow modifying elements and a geometric center of the device in cross-section.

18. The device of claim 16, adjacent ones of the air flow modifying elements are separated by a tangential air space.

19. The device of claim 16, wherein a first air flow modifying element is configured to be positioned in front of a leading edge of the blade and a second air flow modifying element is configured to be positioned behind a trailing edge of the blade.

20. The device of claim 16, wherein the supporting structure comprises a tip support and a root support to which the air flow modifying elements are attached.

* * * * *